United States Patent [19]

Blazic et al.

[11] Patent Number: 5,398,545

[45] Date of Patent: Mar. 21, 1995

[54] DYNAMIC-SETTING PROCESS AND DEVICE, FOR CHECKING THE DYNAMIC BEHAVIOR OF TIRES

[75] Inventors: Oscar Blazic, Monza; Enea Ronzoni, Abbiategrasso, both of Italy

[73] Assignee: Pirelli Coordinamento Pneumatici S.p.A., Milan, Italy

[21] Appl. No.: 38,980

[22] Filed: Mar. 26, 1993

[30] Foreign Application Priority Data

Mar. 26, 1992 [IT] Italy .................. MI92A0716

[51] Int. Cl.⁶ .......................... G01M 17/02
[52] U.S. Cl. ...................... 73/146; 73/865.6
[58] Field of Search ............ 73/146, 8, 865.6

[56] References Cited

U.S. PATENT DOCUMENTS

| | | | |
|---|---|---|---|
| 3,552,200 | 1/1971 | Hermanns et al. | 73/146 |
| 3,864,967 | 2/1975 | Krenzel | |
| 4,238,954 | 12/1980 | Langer | 73/146 |
| 4,955,229 | 9/1990 | Himmler | |
| 4,956,995 | 9/1990 | Harold et al. | 73/146 |
| 4,964,299 | 10/1990 | Maier et al. | 73/146 |
| 5,027,649 | 7/1991 | Himmler | |
| 5,067,348 | 11/1991 | Himmler et al. | 73/146 X |

FOREIGN PATENT DOCUMENTS 3835985 4/1990 Germany .
3922288 1/1991 Germany .

OTHER PUBLICATIONS

Measurement Techniques, vol. 24, No. 10, Oct. 1981, New York, US, pp. 860–863; A. S. Bol'shikh: 'Dynamic Calibration and Checking of Force Gauges'.

*Primary Examiner*—Richard E. Chilcot, Jr.
*Assistant Examiner*—Joseph L. Felber
*Attorney, Agent, or Firm*—Stevens, Davis, Miller & Mosher

[57] ABSTRACT

The dynamic setting of an apparatus (1) designed to check the behavior of tires comprises a rotating drum (9) arranged to act in thrust relation on a rotatable tire. A dynamometer cell (10) is connected to an electronic processing unit (12) for detecting the dynamic forces transmitted from the tire (5) to the drum (9). The setting is carried out by applying a predetermined static load to the drum (9) and afterwards transmitting cyclic dynamic forces having a predetermined frequency, intensity and dynamic variation to said drum. The cyclic forces are produced by an eccentric (20) transmitting a reciprocating motion to a movement block (22) connected to the dynamometer cells (10) by springs (29, 31). Signals emitted by the dynamometer cells (10) are detected and stored by the processing unit (12) in order to obtain data to be compared with signals emerging during the test of a tire (5).

15 Claims, 2 Drawing Sheets

DYNAMIC-SETTING PROCESS AND DEVICE, FOR CHECKING THE DYNAMIC BEHAVIOR OF TIRES

Background of the Invention

The present invention relates to a dynamic-setting process and device, used in conjunction with an apparatus designed to check the dynamic behavior of tires. The apparatus is of the type comprising a rotating drum connected to a base upon interposition of dynamometric detection means and arranged to act in thrust relation according to various (radial, lateral, longitudinal) directions by a given static preloading on a tire driven in rotation according to an axis parallel to the drum axis, said dynamometric detection means being connected to an electronic processing unit in order to detect cyclic forces transmitted to the drum in addition to said static preloading.

It is known that in tires for vehicle wheels in general the presence of possible geometric and/or structural faults can easily give rise, in use, to the occurrence of cyclic dynamic forces, the frequency of which is equal to, or correlated with the rotation rate of the tire. These cyclic dynamic forces are unavoidably transmitted to the vehicle to which the tire is mounted, which may involve the risk of impairing the safety and/or ride comfort of the vehicle.

It is therefore necessary to ensure that these cyclic forces, taking into account the operational behavior of the tire, be limited to well defined limits.

In this connection, apparatus have been conceived and used that are capable of detecting the dynamic forces transmitted by a tire subjected to conditions simulating ride conditions.

With the use of this apparatus the tested tire, which is operatively mounted on rotatable a rim, is rotated against a cylindrical drum rotatably supported by a base and acting in thrust relation against the tire according to one or more directions at right angles to each other, by a given static preloading. Connected to the opposite sides of the drum are at least two multi-axial dynamometric cells, for example of the piezoelectric or strain gage type, connected to an electronic processing unit for transmitting electric signals proportional to stresses transmitted to the drum, to said processing unit. By suitably processing signals coming from the dynamometric cells, the processing unit is capable of detecting when preloading is reached at the beginning of the test and the intensity, frequency and cyclic variation of the dynamic forces transmitted by the tire to the drum during the execution of said test.

The cyclic dynamic forces that are algebraically added to the static starting preloading can be represented by a graph reproducing, on the abscissas, the different angular positions taken by a given section plane of the tire during the rotation thereof and, on the ordinates, the values taken by the dynamic forces at the corresponding angular positionings. In this way the dynamic forces are represented by cyclic curves in which the gap between the upper and lower peak values does not exceed a predetermined limit in order that a tire may be considered as good.

The development of the cyclic curves also enables the type of fault present in a tire to be established. For example, a geometric eccentricity of the tire gives rise to a curve having a sinusoidal shape, whereas when the carcass plies overlap too much at a junction the produced cyclic curve has sudden peaks alternated with substantially horizontal stretches. Still by way of example, a trueing up of a defective belt structure with respect to the equatorial plane of the tire gives rise to cyclic side forces detectable by the difference found between the instantaneous stresses by the two dynamometer cells.

In order that the electronic processing unit may be able to correctly interpret signals sent to it by the dynamometer cells, appropriate setting operations are provided to be executed before starting use of the apparatus exercise, both as regards the static preloading and said cyclic dynamic forces. Presently all the above operations are carried out when the drum is at a standstill: more particularly, as regards setting in connection with static preloading, the drum is pressed against a tire using thrusts having different values, a dynamometric plate being interposed therebetween. Indications given by the plate enable a connection to be established between the load really applied to the tire and the deformation undergone by the dynamometer cells supporting the drum axis, so that the applied load and the signal emitted by the cells and sent to the processing unit can be brought into mutual relation. In practice, signals received by the processing unit from the dynamometer cells are allocated a value corresponding to the load actually applied to the drum. This data is stored in the electronic processing unit. Said operations are carried out several times in succession and different loads are applied each time so that the electronic processing unit is able to identify a so-called "response curve" of the dynamometer cells. In other words, the processing unit is put in a position to go back, based on the intensity of the signal it receives from the dynamometer cells, to the size of the force that has produced said signal.

As regards setting in connection with cyclic dynamic forces, it is carried out statically as well, when the machine is at a standstill and in the absence of preloading, by transmitting predetermined static forces to the drum, in the absence of a tire, which are generally obtained by applying given weights to suitable linkages acting between the base and the drum, and by allocating values to the corresponding signals emitted by the dynamometer cells which are coincident with those of the forces that have generated said signals.

If it is now desired to detect the behavior of a tire under simulated under-load operating conditions, the machine is activated by urging the drum against said tire, as far as the signal emitted by the dynamometer cells compared with that stored during the setting operations shows that the desired preloading has been reached.

At this point there is also activation of the motor driving the rim on which the tire is mounted: said rim starts rotatably driving the drum as well, while the machine performs the expected test cycle comprising a predetermined number of rotations of the tire in one direction or the other, at predetermined speeds, detecting in the meantime the cyclic dynamic forces transmitted by the tire to the drum and hence, through the dynamometer cells, to the signal processing unit.

It is noted however that the above described setting process does not enable a satisfactory operating reliability of the checking machines to be achieved, probably due to the fact that the static setting relating to cyclic dynamic forces is not greatly representative of the dynamic phenomenon and in addition it is carried out leaving the electric circuits of the apparatus inactive, said circuits instead operating during the execution of the operating cycle of the machine while the tire is rotating.

It appears in particular that two identical apparatuses, set in the above manner, give the same readings only as regards the static loads applied to the drum, while they can read dynamic stresses that occur during the tire test in a different manner one from the other and therefore their values are unreliable. It has been found that in case of tests carried out on the same tire using two identical apparatuses the operating conditions of which are perfectly the same, the dynamic forces detected on each said apparatus very often differ.

The origin of this problem is not well known to technicians skilled in this particular field, neither can it be easily determined. It is however apparent that in the presence of dynamic stresses, signals emitted from the load cells are not exactly proportional to the intensity of the forces actually applied to the drum. In addition, outcomes resulting from signal processing, under dynamic-stress conditions, are likely to be affected by different factors which are difficult to control, such as for example structure and/or behavior differences in the electronic circuits or presence of electromagnetic fields generated by the apparatus during the operating cycle, which are capable of having influence on the electronic processing unit.

SUMMARY OF THE INVENTION

In accordance with the present invention it has been found that in order to achieve a satisfactory operating reliability in the above mentioned control apparatus it is necessary to solve the technical problem concerning the achievement of a correct interpretation of signals coming from the dynamometer cells during the whole operating cycle, when said signals and interpretation are affected by other outer and/or inner factors independent of the tire and of difficult identification and assessment.

The object of the present invention is to eliminate the above technical problem by providing a setting process and device the use of which enables a greater reading reliability to be achieved on apparatus for checking the dynamic behavior of tires.

The foregoing and further objects will become more apparent in the course of the present description which is given hereinafter for illustrative purposes only and is not limitative.

The present invention in one aspect relates to a dynamic-setting process, for use in conjunction with an apparatus designed to check the dynamic behavior of tires, characterized in that it comprises the following steps:
  a) starting the operating cycle of the machine in the absence of the tire being tested;
  b) applying a predetermined radial static-preloading force to the drum;
  c) transmitting cyclic dynamic forces having predetermined frequency, intensity and dynamic variation, to the drum;
  d) processing signals transmitted by the dynamometric detection means following the application of said cyclic forces, and allocating frequency, intensity and dynamic-variation values to said signals, which values correspond to the cyclic forces transmitted during step c);
  e) storing data obtained from said signal processing in the processing unit;
  f) repeating steps c), d) and e) several times in succession, each time transmitting predetermined cyclic forces having different frequency, intensity and dynamic-variation features in order to obtain stored data that lends itself to be compared with the measurements detected during the test of a tire in order to check the dynamic behavior thereof.

The present invention in a second aspect relates to a dynamic setting device for an apparatus designed to check the dynamic behavior of tires, comprising at least one dynamic-stress unit having: a bearing framework fixedly engaged to the base; spring means acting between said bearing framework and dynamometric detection means, and driving means for said spring means, designed to transmit static preloading forces and cyclic forces of predetermined amount, frequency and dynamic variation to said dynamometric detection means.

In a particular embodiment of the invention said means comprises: at least one motor fastened to the bearing framework; at least one drive shaft rotated by said motor; at least one eccentric associated with the drive shaft; at least one connecting rod having a first end engaged to the eccentric and a second end engaged to a movement block slidably guided on the bearing framework; an intermediate block slidably guided on the bearing framework and elastically linked to the movement block; an end block slidably guided on the bearing framework, elastically linked to the intermediate block and connected to said dynamometric detection means; a first spring operatively engaged between the movement block and the intermediate block; and a second spring operatively engaged between the intermediate block and the end block.

BRIEF DESCRIPTION OF THE DRAWINGS

Further features and advantages will be better understood from the detailed description of a preferred embodiment of a dynamic-setting process and device, for apparatus designed to check the dynamic behavior of tires in accordance with the present invention, given hereinafter by way of non-limiting example with reference to the accompanying drawings, in which.

Figure 1:
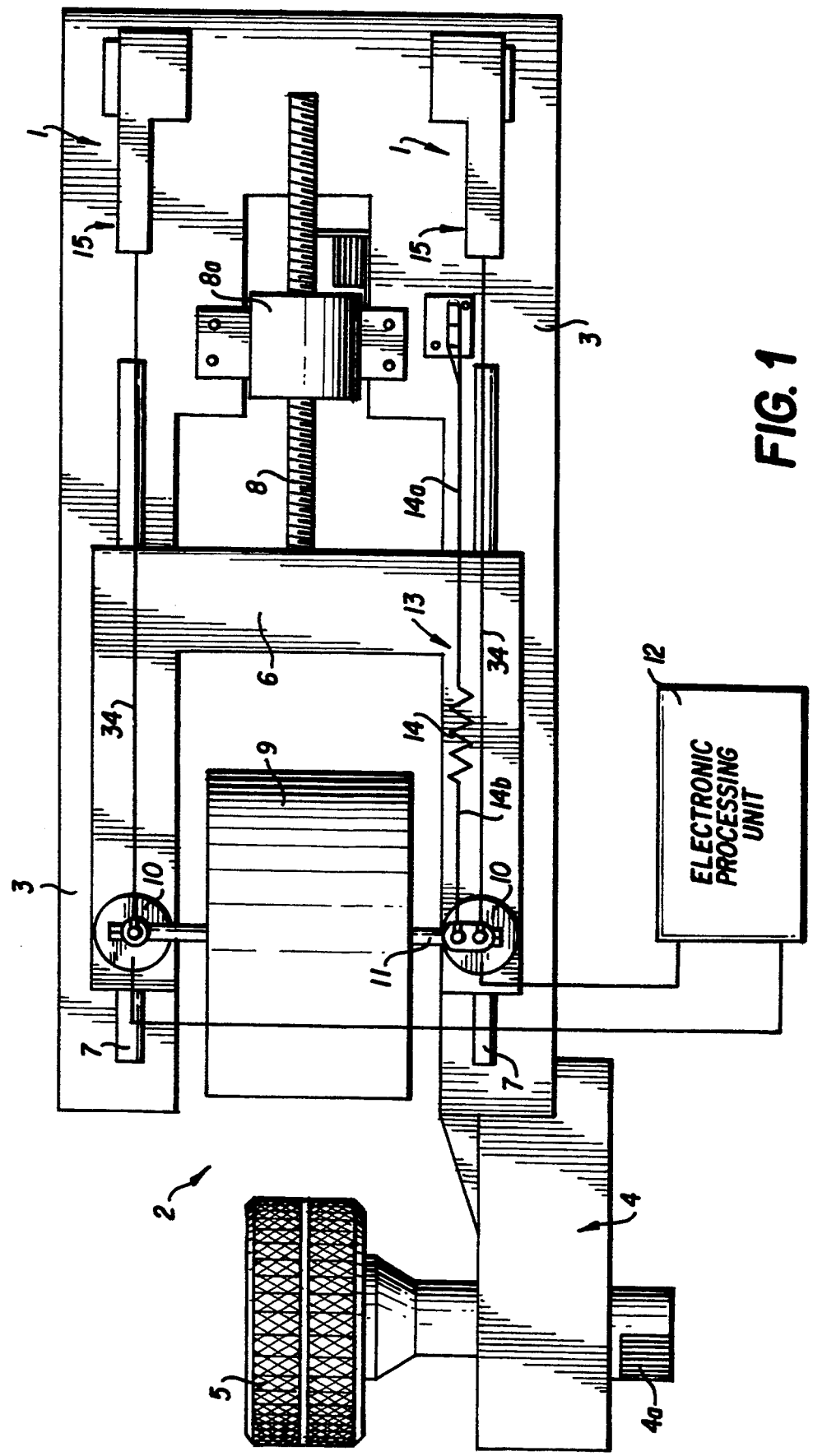
FIG. 1 is a diagrammatic top view of an apparatus for the dynamic checking of tires, on which a device adapted to carry out a dynamic setting of the apparatus in accordance with the process of the invention is mounted.

Referring to the drawings, a dynamic-setting device for apparatus designed to check the dynamic behavior of tires in accordance with the present invention has been generally identified by reference numeral 1.

The device is adapted to be mounted, preferably in a detachable manner, to a conventional apparatus, generally denoted by 2, for checking the dynamic behavior of tires. Apparatus 2 essentially comprises a base 3 provided with support means 4 for operatively engaging a rim, not shown in the figures, carrying a tire 5 and rotatably operable by a motor 4a. Also associated with the base 3 is a moveable bearing structure 6 movable toward and away from the tire along slides 7 upon command of a threaded bar 8 or equivalent means operated by an actuator 8a. The movable structure 6 carries a cylindrical drum 9 rotatable on an axis parallel to the axis of tire 5 and arranged to act in thrust relation against said tire while the latter is set in rotation.

FIG. 1 shows the drum and tire axes lying in a horizontal plane; however said apparatus can be made according to a different architecture and for example said axes may be disposed vertically.

Still in a known and conventional manner, apparatus 2 comprises dynamometric detection means comprising at least two dynamometer cells 10, conveniently although not exclusively of the piezoelectric type, associated with the opposite sides of drum 9, respectively. In more detail, in the embodiment shown the presence of two dynamometer cells 10 is provided and they are fastened to the movable structure 6 and connected to respective attachment pins 11 projecting coaxially from the opposite sides of the drum 9. Obviously, a greater number of dynamometer cells may be provided which will be disposed according to a different configuration.

The dynamometer cells 10 emit electric signals the intensity of which is correlated with forces acting on the drum 9 that are transmitted to the cells through the attachment pins 11. The dynamometer cells 10 are connected to an electronic processing unit 12, only diagrammatically shown, that is adapted to suitably process signals coming from the cells in order to ascertain the intensity of the forces that have caused said signals.

In order to enable the processing unit 12 to correctly understand signals coming from the dynamometer cells 10, it is necessary to carry out a preliminary setting operation on apparatus 2, in particular for the purpose of compensating for possible disturbances present during the execution of the operating cycle of the machine and which are not to be directly connected with the tire behavior.

Advantageously, the device 1 is capable of carrying out this operation by putting into practice a process that, in accordance with the present invention, essentially comprises the following steps:

a) starting the operating cycle of the machine in the absence of the tire being tested;

b) applying a predetermined radial static-preloading force to the drum 9;

c) transmitting cyclic dynamic forces having predetermined frequency, intensity and dynamic variation to the drum 9;

d) processing signals transmitted by the dynamometric detection means 10 following the application of said cyclic forces, and allocating frequency, intensity and dynamic-variation values to said signals, which values correspond to the cyclic forces transmitted during step c);

e) storing data obtained from said signal processing in the processing unit 12;

f) repeating steps c), d) and e) several times in succession, each time transmitting predetermined cyclic forces having different frequency, intensity and dynamic-variation features in order to obtain stored data that lends itself to be compared with the measurements detected during the test of a tire 5 for checking the dynamic behavior thereof.

To this end, in accordance with the invention, the device 1 also comprises preloading means 13 for submitting the drum 9 to a given static-preloading force, in the absence of any contact with the tire 5.

Advantageously, it is provided that this preloading means 13 be essentially comprised of a simple dynamometer, that is of at least one spring 14 having a predetermined stiffness coefficient, the opposite ends 14a, 14b of which are connected to the base 3 and drum 9, respectively. By moving said movable structure 6 and therefore the drum 9 towards the support means 4 upon command of the threaded bar 8, an elastic extension of spring 14 is achieved. The amount of the extension multiplied by the stiffness coefficient of spring 14, enables establishment of the value of the force consequently transmitted to the dynamometer cell 10.

The electronic processing unit 12 will store data resulting from the processing of signals produced by the dynamometer cells 10. A value corresponding to the value of the static load acting on drum 9 will be given to this data, from the point of view of the electronic processing unit programming.

The above operating step can be repeated several times, by applying each time preloading forces of different values. Thus a static-setting operation of apparatus 1 is carried out, in the same manner as usually done in the known art, but in an easier, more reliable and precise manner, given that the inventive mechanical system leaves out of consideration the use of a service tire, which is, to the contrary, necessary when the prior art system is used.

On the other hand, for control purposes, settings carried out as above stated can be checked, after removing the preloading device 13 from the machine, by the usual system involving the use of a service tire and a dynamometric plate, by verifying whether data supplied by the plate is coincident with that supplied by the electronic processing unit.

Still in accordance with the present invention, the device 1 further comprises at least one dynamic-stress unit 15 arranged to transmit cyclic forces having predetermined intensity, frequency and dynamic variation to the drum 9 in order to perform a dynamic setting of the machine. This operation is carried out during the operating cycle of the machine while the drum 9 is being subjected to a static preloading, the amount of which is selected depending on the typology of the tires to be successively submitted to tests. When traditional car tires are concerned, the value of the static-preloading force is approximately 300 kg, the value of which is much higher in case of tests on tires for heavy-duty transport means.

In the embodiment shown there are two dynamic-stress units 15 provided, which are connected to the opposite sides of the drum 9 respectively.

Each dynamic-stress unit 15 essentially comprises a bearing framework 16 (see FIG. 2) detachably fastened to the base 3 and carrying at least an electric motor 17 arranged to set in rotation a drive shaft 18 through a speed change gear 19. The speed change gear 19 can be omitted if the electric motor 17 used is of the variable speed type.

Associated with the drive shaft 18 is at least one eccentric 20 operatively engaged to one end 21a of a connecting rod 21 the second end of which 21b acts on a movement block 22 slidably guided on at least a rectilinear bar 23 fastened to the framework 16. The eccentric 20, of an adjustable type, comprises a connecting pin 24 engaging the connecting rod 21 and extending, with its axis parallel to the drive shaft 18 axis, from a runner 25 slidably engaged in a rail 26 and capable of sliding in a radial direction relative to the drive shaft 18. The rail 26, integral with the drive shaft 18, rotatably carries a positioning screw 27 operatively engaged through the runner 25. Therefore, by acting on the positioning screw 27 it is possible to adjust the eccentricity of the pin 24 relative to the drive shaft 18 in order to vary the intensity of the transmitted dynamic forces, as better clarified in the following.

The movement block 22 is connected to the drum 9 upon interposition of spring means 28 for transmitting to the drum the dynamic forces produced following the reciprocating motion imparted to the block upon the action of the eccentric 20.

Advantageously, this spring means 28 comprises a first spring 29 connecting the movement block 22 to an intermediate block 30 operatively engaged with the framework 16 and being mounted for sliding in a direction parallel to the movement direction of the movement block itself.

A second spring 31 having a different stiffness than the first spring 29, connects the intermediate block 30 to an end block 32, slidably engaged with the framework 16 as well, and connected to the drum 9 through inextensible connecting means generally denoted by 33. The inextensible connecting means 33 preferably comprises at least one flexible cable 34 connected to one of the dynamometer cells 10, on a portion of said cell directly connected to the attachment pin 11 of the drum 9. The flexible cable 34 is engaged with a hook element 35 that, upon interposition of threaded members 36 for adjustment of length, is connected to an auxiliary dynamometer cell 37, in turn engaged to the end block 32. The auxiliary dynamometer cell 37 advantageously enables detection of the pretensioning amount to which the cable 34 is subjected when the pin eccentricity is kept to a zero value or to any other predetermined value. In fact the pretensioning value should be added to the force transmitted to the drum 9 by the preloading means 13, for achieving the exact identification of the static-preloading amount acting on the dynamometer cells 10. It is noted that the static-preloading component consisting of said pretensioning can be selected at will, while keeping the component produced by said preloading means 13 unchanged.

Also provided is at least one interconnecting bar 38 engaged between the intermediate block 30 and end block 32. In greater detail, the interconnecting bar 38 is fastened to the intermediate block 30 by threaded elements 39 passing through the bar at one longitudinal elongated hole 40 provided therein. At the same time, the interconnecting bar 38 is slidably connected to the end block 32 by a peg 41 projecting from the block and slidably passing through a second elongated hole 42 formed lengthwise on the bar 38.

By loosening the threaded elements 39 it is possible to adjust the longitudinal positioning of the interconnecting bar 38, for purposes better clarified in the following.

When the electric motor 17 is started, the eccentric 20 transmits a reciprocating motion to the movement block 22 that, through springs 29 and 31, is converted to a pulsating cyclic force having known frequency, intensity and dynamic variation, all said values being adjustable depending upon requirements.

In greater detail, the cyclic-force frequency corresponds to the rotation rate of the drive shaft 18 and is adjustable by suitably acting on the speed change gear 19.

The force intensity is on the contrary correlated with the reciprocating motion stroke performed by the movement block 22 multiplied by the stiffness coefficients of springs 29, 31 and is adjustable by simply acting on the positioning screw 27 in order to modify the eccentricity of the connecting pin 24.

In addition, by modifying the longitudinal positioning of the interconnecting bar 38, upon untightening the threaded members 39, it is possible to select the operating intervention of springs 29, 31 for adjusting the dynamic variation of forces transmitted to the flexible cable 34.

Figure 3:
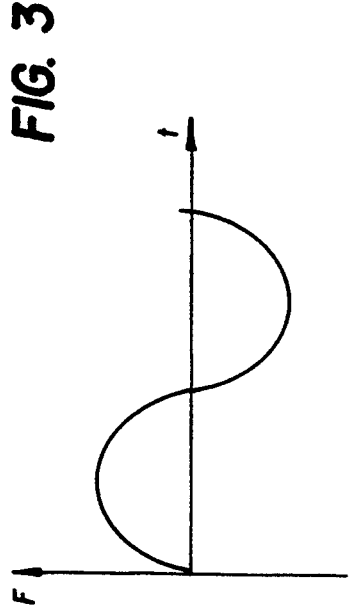
FIG. 3 is a graph showing, by way of example, the cyclic variation of the dynamic forces produced by the device.

In greater detail, when the interconnecting bar 38 is located as shown in the accompanying figures, the variation in time of the cyclic forces follow a substantially sinusoidal path, as shown in the diagram of FIG. 3, simulating the stresses transmitted to the drum 9 when a tire having a slight eccentricity is tested. In fact, the displacement of the movement block 22 brings about a corresponding extension of both springs 29, 31, and in each spring the extension degree corresponds to the value of the stiffness coefficient exhibited by said spring. Consequently the amount of forces transmitted to the flexible cable 34 will equal the product of the displacement performed by the movement block 22 by the sum of the stiffness coefficients of the individual springs.

Figure 2:
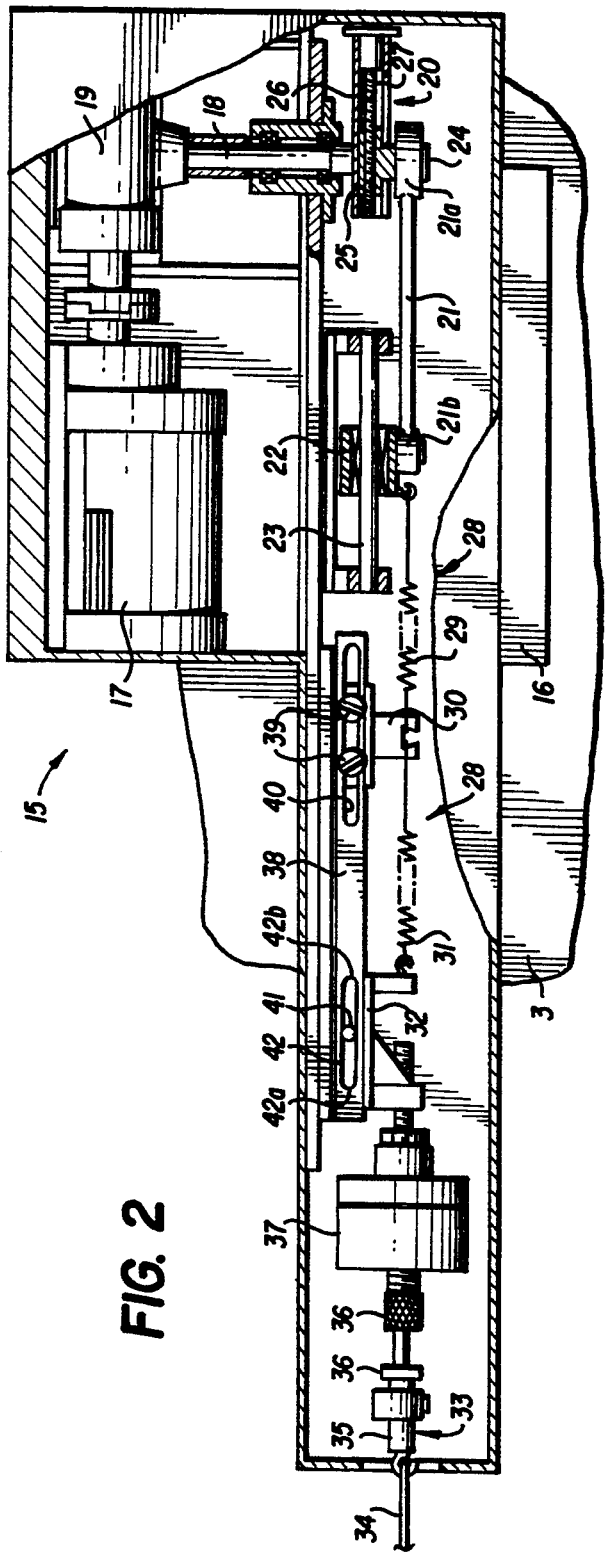
FIG. 2 is a fragmentary top view, to an enlarged scale with respect to FIG. 1, of a dynamic-stress unit which is a part of the subject device.
Figure 4:
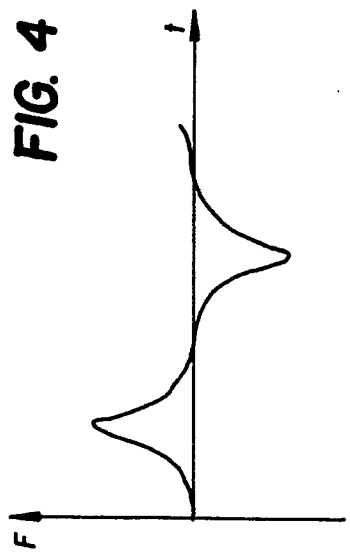
FIG. 4 is a graph showing, still by way of example, a different variation of the dynamic forces obtainable with the subject device.

When on the contrary the interconnecting bar 38 is located in a manner different from FIG. 2, for example in such a manner that the elongated holes 40, 42 are spaced farther apart from the drum 9, an operating condition arises in which over a short length of the movement block stroke the forces transmitted to the cable 34 vary proportionately in a slightly increasing manner by effect of the extension of both springs 29, 31. This situation lasts as far as the interconnecting bar 38, pulled along by the movement of the intermediate block 30, brings one end (42a) of the ends 42a, 42b of the second elongated hole 42 into abutment against the peg 41. From this moment on, even if the movement block 22 continues its stroke, the intermediate block 30 will be unable to move with respect to the end block 32. As a result, the displacements carried out by the movement block 22 for completing its stroke will be favored by the extension of the first spring 29 alone. Consequently, forces transmitted to the flexible cable 34 will have an intensity proportionate to the stiffness coefficient of the first spring 29 alone, which is much higher than the value of the stiffness coefficient resulting from the action of both springs. Therefore the dynamic variation of forces will follow a path, as shown in FIG. 4, exhibiting sudden peaks for example simulating the stresses transmitted to the drum 9 by effect of an overlapping between the carcass plies of a tire being tested.

As can be easily understood, by suitably intervening on the position of the interconnecting bar 38, as well as by removing and/or replacing at least one of the springs 29, 31, it is possible to obtain dynamic force variations following different paths than the examples shown.

In addition, by causing the two dynamic-stress units 15 to suitably interact it is possible to simulate transverse cyclic forces in different directions, such as for example those that are transmitted to the drum 9 when symmetry faults relating to the arrangement of the belt strips are present in a tire being tested.

Obviously, on account of the dynamic forces to which they are subjected, the dynamometer cells 10 associated with the drum 9 transmit electric signals, in the same manner as above described, to the processing unit 12. These signals are processed by allocating them the values corresponding to the frequency, intensity and dynamic variation of the forces that have generated them; afterwards data obtained from signal processing is stored. The transmission of the cyclic forces, as well as the detection, processing and storing of data resulting from the application of these forces are repeated several times in succession, each time modifying the intensity and/or frequency and/or dynamic variation of said forces, so that, at the end of the setting process the electronic processing unit 12 has stored such an amount of data that, in the course of the following tests on tires, carried out after removing the setting device together with the preloading device from the test apparatus, it will be able to immediately find out the degree and nature of the forces transmitted from the tire 5 to the drum 9.

Advantageously it is also provided that the electronic processing unit 12 be capable of sorting out, during the tire test, the signals it has received depending on the frequency they have, in order to consider for test purposes, only those signals the frequency of which is correlated with the rotational speed of the tire. Thus undesired signals due to interferences of any kind are practically almost completely eliminated.

The present invention achieves many important advantages.

In fact, the process and device in question make it possible to carry out the setting of the above apparatus in a manner capable of ensuring a perfect operating reliability of the apparatus itself.

The setting process in accordance with the invention lends itself to be put into practice not only as a preliminary operation before the actual installation of the apparatus, but also at periodical intervals while tests on tires are being carried out, in order to periodically verify whether the processing unit interprets signals coming from the dynamometer cells in a correct manner or not.

It is understood that many modifications and variations may be made to the invention as conceived, all of them falling within the scope of the inventive idea as defined by the appended claims.

We claim:

1. A dynamic-setting process, for an apparatus designed to check the dynamic behavior of tires, said apparatus comprising a rotatable drum mounted on a base with a dynamometric detection means interposed between said drum and said base, said drum being arranged to act in radial thrust relation with predetermined static preloading forces against a tire which is rotatably driven about an axis parallel to an axis of the drum, said dynamometric detection means being connected to an electronic processing unit for detecting dynamic forces transmitted to the drum in addition to said static preloading forces, said process comprising the following steps:

a) starting the operating cycle of the apparatus in the absence of a tire to be tested;
   b) applying a predetermined radial static-preloading forces to the drum;
   c) transmitting to the drum dynamic forces having predetermined frequency;
   d) processing signals transmitted by the dynamometric detection means following the application of said dynamic forces, and allocating frequency and intensity variable values to said signals, said values corresponding to the dynamic forces transmitted during step c);
   e) storing data obtained from said signal processing in the processing unit;
   f) repeating steps c), d) and e) several times in succession, each time transmitting predetermined dynamic forces having different frequency and intensity features in order to obtain stored data to be compared with the measurements detected during the test of a tire in order to check the dynamic behavior of said tire.

2. A process according to claim 1, in which, between steps b) and c), the following further steps are carried out:

g) processing signals transmitted by the dynamometric detection means following the application of said static-preloading forces and allocating a value to said signals having an intensity corresponding to the static-preloading forces applied in step b);
   h) storing data obtained in step g) in the processing unit;
   i) repeating steps b), g) and h) several times in succession, each time applying static preloading forces of different value in order to obtain stored data to be compared with the measurements detected during the test of a tire in order to verify the preloading applied to said tire.

3. A process according to claim 1, in which the amount of said predetermined radial static-preloading forces applied to the drum comprises at least two distinct and independently variable preloading components.

4. A dynamic-setting device, for an apparatus designed to check the dynamic behavior of tires, said apparatus comprising:

a rotatable drum mounted on a support base with a dynamometric detection means interposed between said drum and said base, said drum being arranged to act in radial thrust relation with a given static preloading forces against a tire which is rotatably driven about an axis parallel to an axis of said drum, said dynamometric detection means being connected to an electronic processing unit for detecting dynamic forces transmitted to the drum in addition to said static preloading forces, said device including at least one dynamic-stress unit having:
   (a) a bearing framework fixedly engaged to the base;
   (b) a first spring means and a second spring means acting between said bearing framework and said dynamometric detection means, and
   (c) driving means for said first and second spring means for transmitting static preloading forces and dynamic forces of predetermined intensity variation to said dynamometric detection means.

5. A device according to claim 4 in which said driving means comprises:

at least one motor mounted on the bearing framework;
   at least one drive shaft rotated by said at least one motor;
   at least one eccentric driven by said at least one drive shaft;
   at least one connecting rod having one end engaged with said at least one eccentric and a second end engaged with a movement block slidably mounted on the bearing framework;
   an intermediate block slidably mounted on the bearing framework, said first spring means elastically linking the intermediate block to the movement block;

an end block slidably mounted on the bearing framework, said second spring means elastically linking the intermediate block to said end block and said dynamometric detection means;

at least one interconnecting bar detachably fastened to the intermediate block and connected to the end block by a peg projecting from the end block and slidably engaging in a longitudinal elongated hole in said interconnecting bar, said longitudinal elongated hole being arranged so that at least one of its ends comes into abutment against the peg in order to stop the mutual movement of the intermediate and end blocks.

6. A device according to claim 5 in which said at least one interconnecting bar is positionable longitudinally with respect to the intermediate and end blocks so as to modify the relative positioning between said peg and said longitudinal elongated hole.

7. A device according to claim 5 in which said at least one interconnecting bar is connected to the intermediate block by threaded elements acting through another longitudinal elongated hole provided in the bar.

8. A device according to claim 5 in which the connection between the end block and the dynamometric detection means is by a flexible cable.

9. A device according to claim 8 including a second dynamometric detection means comprising an auxiliary dynamometer cell positioned between said end block and the end of said flexible cable.

10. A device according to claim 5 in which said eccentric comprises:

a rail integral with said at least one drive shaft;

a runner slidably engaged on the rail and movable in a radial direction with respect to the axis of the drive shaft;

a connecting pin projecting from the runner and operatively engaging said at least one connecting rod;

a positioning screw acting between the rail and the runner for adjusting an eccentricity of the connecting pin relative to said at least one axis of the drive shaft.

11. A device according to claim 5 further comprising at least one speed change gear interposed between the motor and the drive shaft for adjusting the frequency of said dynamic forces.

12. A device according to claim 4 in which the connection between said first and second spring means and said dynamometric detection means is carried out by second dynamometric detection means, for measuring the static-preloading value of said first and second spring means.

13. A device according to claim 4 comprising two dynamic-stress units, respectively acting on the opposite sides of the drum.

14. A device according to claim 4 comprising preloading means for subjecting the drum to a given static-preloading force in the absence of contact with the tire.

15. A device according to claim 14 in which said preloading means comprises at least one spring having a predetermined stiffness coefficient, the opposite ends of which are connected to the base and the drum, respectively.

* * * * *